United States Patent
Kezobo et al.

(10) Patent No.: US 8,326,493 B2
(45) Date of Patent: Dec. 4, 2012

(54) MOTOR DRIVEN POWER STEERING CONTROL APPARATUS FOR SUPPRESSING VIBRATION

(75) Inventors: Isao Kezobo, Tokyo (JP); Masahiko Kurishige, Tokyo (JP); Masaya Endo, Tokyo (JP); Takayuki Kifuku, Tokyo (JP); Seiji Sawada, Tokyo (JP); Masaki Matsushita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 363 days.

(21) Appl. No.: 12/676,633

(22) PCT Filed: Dec. 14, 2007

(86) PCT No.: PCT/JP2007/074113
§ 371 (c)(1),
(2), (4) Date: Mar. 5, 2010

(87) PCT Pub. No.: WO2009/078074
PCT Pub. Date: Jun. 25, 2009

(65) Prior Publication Data
US 2011/0153162 A1    Jun. 23, 2011

(51) Int. Cl.
*B62D 6/00* (2006.01)
(52) U.S. Cl. ............... 701/42; 180/446; 318/434
(58) Field of Classification Search ........... 701/1, 36, 701/41–44; 180/443, 446; 318/629, 632, 318/432, 434
See application file for complete search history.

(56) References Cited

U.S. PATENT DOCUMENTS

| | | | | |
|---|---|---|---|---|
| 4,885,722 A | * | 12/1989 | Leland | 367/25 |
| 5,136,507 A | * | 8/1992 | Shiraishi et al. | 701/41 |
| 5,182,711 A | * | 1/1993 | Takahashi et al. | 701/41 |
| 5,473,231 A | | 12/1995 | McLaughlin et al. | |
| 5,504,403 A | | 4/1996 | McLaughlin | |
| 5,704,446 A | * | 1/1998 | Chandy et al. | 180/446 |
| 5,719,766 A | * | 2/1998 | Bolourchi et al. | 701/42 |
| 6,122,579 A | * | 9/2000 | Collier-Hallman et al. | 701/41 |
| 6,161,068 A | * | 12/2000 | Kurishige et al. | 701/41 |
| 6,827,177 B2 | * | 12/2004 | Asada et al. | 180/446 |
| 7,068,923 B2 | * | 6/2006 | Miyazaki | 388/806 |
| 7,379,802 B2 | * | 5/2008 | Kasbarian et al. | 701/36 |
| 7,684,912 B2 | * | 3/2010 | Nishimura | 701/41 |
| 2004/0099471 A1 | | 5/2004 | Asada et al. | |

(Continued)

FOREIGN PATENT DOCUMENTS
EP     1 502 837 A1    2/2005
(Continued)

OTHER PUBLICATIONS

Zaremba et al, Vibration Control Based on Dynamic Compensation in an Electric Power Steering System, 1st International Conference on Control of Oscillations and Chaos, 1997, pp. 453-456.*

(Continued)

*Primary Examiner* — Russell Frejd
(74) *Attorney, Agent, or Firm* — Oblon, Spivak, McClelland, Maier & Neustadt, L.L.P.

(57) ABSTRACT

A motor-driven power steering control apparatus is achieved, which uses a small-amplitude pass filter, the filter filtering out a component having a small amplitude, to remove a steering component from dynamic state quantity such as a rotational speed signal, and to accurately extract only a vibration component having a small amplitude compared with the steering component, and controls the vibration component to be reduced.

6 Claims, 5 Drawing Sheets

U.S. PATENT DOCUMENTS

2005/0027417 A1  2/2005  Sawada et al.
2005/0119810 A1* 6/2005  Kasbarian et al. .............. 701/36

FOREIGN PATENT DOCUMENTS

| | | |
|---|---|---|
| JP | 5 155351 | 6/1993 |
| JP | 7 257830 | 10/1995 |
| JP | 07 309247 | 11/1995 |
| JP | 9 215106 | 8/1997 |
| JP | 10 258748 | 9/1998 |
| JP | 2002 34290 | 1/2002 |
| JP | 2003 026022 | 1/2003 |
| JP | 2003 261038 | 9/2003 |
| JP | 2004 170174 | 6/2004 |
| JP | 2006 115575 | 4/2006 |
| JP | 2006 335228 | 12/2006 |
| JP | 2007 269175 | 10/2007 |

OTHER PUBLICATIONS

Lee et al, Reduction of Torque Ripple in AC Motor Drives for Electric Power Steering, 2005 IEEE International Conference on Electric Machines and Drives, 2005, pp. 2006-2011.*

Zaremba et al, Dynamic Analysis and Stability of a Power Assist Steering System, Proceedings of the American Control Conference, 1995, pp. 4253-4257.*

Chen et al, Optimal Control of Electric Power-Assisted Steering System, Proceedings of 2005 IEEE Conference on Control Applications, 2005, pp. 1403-1408.*

Extended Search Report issued Sep. 26, 2011 in European Application No. 07850617.7.

* cited by examiner (a) PROPORTIONAL GAIN CONTROLLER (b) PID CONTROLLER (c) RELAY CONTROLLER (d) SATURATION CONTROLLER

MOTOR DRIVEN POWER STEERING CONTROL APPARATUS FOR SUPPRESSING VIBRATION

TECHNICAL FIELD

The present invention relates to a motor-driven power steering control apparatus assisting steering force of a car driver, and particularly relates to a motor-driven power steering control apparatus that may suppress vibration due to torque ripple or disturbance.

BACKGROUND ART

In a motor-driven power steering control apparatus that provides assist power generated by an electric motor in accordance with steering torque applied to a handle by a car driver, assist torque approximately proportional to steering torque is determined, and a torque proportional gain, which keeps such a proportional relationship, is set large so that steering force of a driver is reduced and smoothed, and besides, vibration such as torque ripple produced by a motor or disturbance transmitted from a road surface is suppressed, improving feeling of the driver.

In the motor-driven power steering control apparatus of this type proposed in the past, a mixed filter including a low-pass filter (LPF) and a high-pass filter (HPF) is used to suppress the vibration such as motor torque ripple or road surface disturbance, a steering component is extracted by the LPF to control steering assist torque, and a high-frequency vibration component such as torque ripple is extracted by the HPF, and the high-frequency vibration component is controlled by a different controller (different gain) from a controller for the low-frequency vibration component (for example, refer to patent document 1).

Moreover, a motor-driven power steering control apparatus is previously proposed, in which a bandpass filter (BPF) is used to extract a vibration component of motor rotation speed or angular velocity of a steering angle, and a signal as a product of the vibration component multiplied by a gain is subtracted from a target current so that a new target current is set, thereby negative feedback control of angular velocity is established to reduce vibration (for example, refer to patent document 2).

Besides, there exist a motor-driven power steering control apparatus having hysteresis processing means that filters a steering torque signal by using a hysteresis function in order to remove small variation such as bit variation from the steering torque signal (for example, refer to patent document 3).

Patent document 1: Japanese Patent No. 2838053
Patent document 2: JP-A-2003-26022
Patent document 3: JP-A-2004-170174

DISCLOSURE OF THE INVENTION

Problems that the Invention is to Solve

In the previous motor-driven power steering control apparatus as in the patent document 1 or 2, the high-pass filter (HPF) and low-pass filter (LPF) or the bandpass filter (BPF) are/is used in extracting a vibration component such as torque ripple or road surface disturbance. For example, when a frequency band of torque ripple produced by a motor is separate from a frequency band of disturbance transmitted from a road surface, only one frequency band component may be extracted. In addition, when the vibration component such as torque ripple or road surface disturbance is even partially overlapped with a frequency band of a steering component, accurate extraction may not be performed, and consequently not all vibration components over a wide band have been able to be suppressed.

The method performed in the previous motor-driven power steering control apparatus as that of the patent document 3, in which a signal is filtered by using the hysteresis function to remove small vibration such as bit variation, has had a problem that the vibration component may not be extracted.

The invention was made to solve the above problems, and an object of the invention is to achieve a motor-driven power steering control apparatus that may accurately extract a vibration component such as torque ripple produced by a motor or disturbance transmitted from a road surface, and may control such a vibration component to be easily reduced.

Means for Solving the Problems

A motor-driven power steering control apparatus, including a torque sensor detecting steering torque applied by a driver, a torque controller calculating an assist torque current assisting the steering torque based on a steering torque signal detected by the torque sensor, and a motor generating assist torque with the assist torque current, is characterized by having dynamic state quantity detection means detecting dynamic state quantity of the motor-driven power steering control apparatus or a car; a small-amplitude pass filter filtering out a vibration component from detection output of the dynamic state quantity detection means; and vibration suppression control means reducing a vibration component signal obtained by the small-amplitude pass filter; wherein a feedback control loop, including addition/subtraction between the assist torque current being output of the torque controller and a vibration suppression current being output of the vibration suppression control means, is established, thereby a vibration component of the motor is suppressed.

Advantage of the Invention

The motor-driven power steering control apparatus of the invention is characterized by using the small-amplitude pass filter, thereby a motor-driven power steering control apparatus may be advantageously achieved, which may accurately extract a vibration component having a small amplitude compared with a steering component, such as torque ripple produced by a motor or disturbance from a road surface, and may efficiently reduce such a vibration component by using a feedback control loop.

BEST MODE FOR CARRYING OUT THE INVENTION

Embodiment 1

FIG. 1 is a block diagram showing a configuration of a motor-driven power steering control apparatus of embodiment 1 of the invention. While detailed description of the motor-driven power steering apparatus itself is omitted herein, a previously known configuration may be used, and a configuration described in each of the patent documents 1 and 2 may be referred, for example.

In the figure, steering torque TO in driver steering is detected by a torque sensor 1 using a known torsion bar or the like, and a torque controller 2 calculates an assist torque current Ia to be provided to a motor 5 based on such torque sensor output . On the other hand, rotational speed of the motor 5 is detected by a known rotational speed detection means 7.

Next, a rotational speed signal Sn outputted by the rotational speed detection means 7 is filtered by a small-amplitude pass filter 8 having an input/output characteristic as shown in FIG. 2, thereby a steering component is removed from the rotational speed signal Sn and only a vibration component signal Sb is extracted. The small-amplitude pass filter 8 extracts only a vibration component having a small amplitude compared with the steering component, and how to configure the filter is described in detail later.

A vibration suppression current Is is calculated by a vibration suppression control means 9 based on the vibration component signal Sb extracted by the small-amplitude pass filter 8, and the current Is is subtracted from the assist torque current Ia from the torque controller 2 by a subtractor 10, thereby a target current It to control the motor 5 is obtained. Current control means 3 controls the calculated target current It and a current Id detected by current detection means 6 to corresponds to each other, and outputs a voltage instruction signal Sv such as PWM signal to a drive circuit 4 including an H bridge circuit or the like, so that the drive circuit 4 outputs a drive current corresponding to the PWM signal to the motor 5. The motor 5 generates assist torque assisting steering force of a steering shaft applied by a driver.

Not all configuration blocks of the control apparatus shown in FIG. 1 are configured by hardware, and a configuration from each of the output torque signal TO of the torque sensor 1 and the signal Sn detected by the rotational speed detection means 7 to calculation of the target current It by the subtractor 10, or to the voltage instruction signal Sv outputted by the current control means 3 is configured by software using a microcomputer. The microcomputer includes a central processing unit (CPU), a read-only memory (ROM), a random access memory (RAM), an interface (IF) and the like as well known, and sequentially extracts programs stored in the ROM to perform desired calculation in the CPU, and temporarily stores a calculation result into the RAM, thereby the software is executed and thus predetermined control operation is performed.

Operation of the motor-driven power steering control apparatus configured as above is described according to a flowchart of FIG. 3. First, a steering torque signal τ0 being output of the torque sensor 1 is read by the microcomputer, and stored into a memory in step S101. Then, a rotational speed signal Sn read from the rotational speed detection means 7 is stored into the memory in step S102. Next, the assist torque current Ia is calculated by the torque controller 2 based on the steering torque signal τ0, and output thereof is stored into the memory in step S103. Here, the torque controller 2 may be designed in a known manner, for example, in a manner that the current is calculated based on predetermined map data.

Next, the vibration component signal Sb is calculated by the small-amplitude pass filter 8 based on the rotational speed signal Sn read from the rotational speed detection means 7, and stored into the memory in step S104. Next, the vibration suppression current Is is calculated by the vibration suppression control means 9 based on the vibration component signal Sb being output of the small-amplitude pass filter 8, and stored into the memory in step S105. Then, the subtractor 10 subtracts the vibration suppression current Is from the assist torque current Ia outputted by the torque controller 2 so that the target current It is determined in step S106. Operation from the step S101 to the step S106 is repeated for each control sample to calculate each target current It.

Next, the small-amplitude pass filter 8 is described. As shown in FIG. 2, the small-amplitude pass filter has a property that while a variation component having a level equal to or larger than a level B is saturated and not outputted, a variation component having a level equal to or smaller than the level B, which appears near a particular operating point of an input signal, is directly outputted as variation having a level equal to or smaller than the level B. Size of such a variation range, namely, size of a hysteresis range H can be correspondingly set with size of a vibration component to be desirably extracted as a reference. For example, a variation component included in the rotational speed signal is about 0.025 to 0.25 rad/s in terms of angular velocity about a handle axis, and a variation component included in the steering torque signal is also about 0.025 to 0.25 Nm. Such amplitude values are expressed as half amplitude values respectively.

FIG. 4 is a block diagram showing a typical configuration example of the small-amplitude pass filter 8, the filter 8 being configured of a hysteresis filter 21 that is inputted with an output signal of the rotational speed detection means 7, and performs hysteresis processing having a hysteresis range corresponding to the vibration component, and a subtractor 22 that subtracts an output signal of the hysteresis filter 21 from the output signal of the rotational speed detection means 7. The input signal Sn outputted by the rotational speed detection means 7 is branched, and the branched signal is filtered through a hysteresis filter 21 into a signal H0, and the signal HO is subtracted from the input signal Sn so that the vibration component signal Sb is obtained. If the small-amplitude pass filter 8 is designed in a manner of FIG. 4, the filter 8 may be easily configured using typical elements.

FIG. 5 shows temporal waveforms of signals of respective portions of the small-amplitude pass filter 8 shown in FIG. 4, wherein (a) is a waveform diagram of the input signal Sn, (b) is a waveform diagram of the output signal HO of the hysteresis filter 21, and (c) is a waveform diagram of the output signal Sb. In each figure, a vibration component included in the rotational speed signal is expressed as a value (rad/s) in terms of angular velocity about a handle axis. The input signal Sn shown in (a) has a vibration component, and furthermore, has a steering component Ps shown by a dashed-dotted line as a large amplitude component. The hysteresis output HO shown in (b) has a waveform attenuated in vibration component compared with the input signal Sn. The output signal Sb shown in (c) is a calculation result of a subtractor 22 on the hysteresis output HO and the input signal Sn, where the steering component Ps is removed from the input signal Sn, and only the vibration component Sb is extracted from the signal Sn.

In this case, amplitude of the vibration component Sb corresponds to a hysteresis range H (0.03 to 0.04 in half amplitude), and is attenuated by S compared with amplitude of the input signal Sn (0.05 in half amplitude), showing a fact that hysteresis processing is performed. It will be appreciated that the hysteresis range H is appropriately adjusted, thereby the amount of the attenuation may be controlled. Generally, the vibration component is characteristically small compared with the steering component Ps being a main component. Therefore, the small-amplitude pass filter 8 extracting only a component having a small amplitude compared with the steering component Ps may remove the steering component Ps, and may accurately extract the vibration component Sb.

Next, the vibration suppression control means 9 is described. For example, the vibration suppression control means 9 includes means as shown in FIGS. 6(a) to 6(d) as typical examples. Each example is a known configuration example, and any other control means may be used. Hereinafter, the typical examples of FIG. 6 are described.

First, (a) shows a proportional gain controller. In the case of the embodiment, the controller operates as a controller performing damping control based on the vibration component signal Sb extracted from the rotational signal, and may reduce vibration according to gain K.

As described in the patent document 2, when rotational speed is multiplied by a gain, and negative feedback control is performed and thus damping control is established, the signal is controlled such that variation in rotational speed is suppressed, and consequently vibration may be reduced. (b) shows a case of a PID gain controller, wherein since a phase characteristic or a gain characteristic may be adjusted by a plurality of parameters, appropriate vibration suppression characteristics may be obtained for various kinds of vibration compared with a simple proportional gain controller.

(c) shows a relay controller using a relay function. In the case of the embodiment, for example, the controller is suitable for suppressing disturbance having finite size of amplitude and a known upper limit thereof, or for suppressing vibration based on a vibration component signal extracted as a signal having an extremely small amplitude, and the controller operates to suppress variation like Coulomb friction. (d) shows a case of a saturation controller using a saturation function. The controller has a similar effect to that in a case of using the relay function, and furthermore, has an effect of suppressing unexpected vibration such as chattering that tends to occur in sudden change of a value as in the case of using the relay function. The control means shown in FIGS. 6(a) to 6(d) are typically used elements. The embodiment is characterized in that each of the control means is combined with the small-amplitude pass filter 8 to establish negative feedback control with the subtractor 10, so that vibration suppression is easily achieved.

As hereinbefore, according to the configuration of the embodiment 1 of the invention, the steering component Ps is removed from the rotational speed signal Sn, and a vibration component such as torque ripple produced by a motor or disturbance from a road surface, which has a small amplitude compared with the signal Ps, may be accurately extracted, and vibration may be easily reduced based on the extracted vibration component signal Sb, and therefore feeling of a driver may be improved during steering driving.

The rotational speed detection means, which directly detects rotational speed of a motor, has been used in the above configuration. However, rotation angle detection means detecting a rotation angle of a motor and rotational speed calculation means calculating rotational speed from a detected rotation angle signal may be used instead of the rotational speed detection means so that a rotational speed signal is obtained.

Embodiment 2

FIG. 7 is a block diagram showing a configuration of a control apparatus of embodiment 2 of the invention. While the small-amplitude extraction filter 8 is used for the rotational speed signal Sn to perform vibration suppression control in the embodiment 1, the small-amplitude extraction filter 8 is used for the steering torque signal t0 detected by the torque sensor 1 to perform vibration suppression control in the embodiment 2. In FIG. 7, portions equal to or corresponding to those in FIG. 1 are shown with the same symbols.

In the figure, steering torque in driver steering is detected by the torque sensor 1, and the torque controller 2 calculates the assist torque current Ia based on the steering torque signal t0 being output of the torque sensor. Next, the steering torque signal t0 outputted by the torque sensor 1 is filtered by the small-amplitude pass filter 8 having the input/output characteristic as shown in FIG. 2, thereby a steering component is removed from the steering torque signal so that the vibration component Sb is extracted. Since a configuration and operation of the small-amplitude pass filter 8 are the same as those described in the embodiment 1, description of them is omitted here.

The vibration suppression current Is is calculated by the vibration suppression control means 9 based on the vibration component signal Sb extracted by the small-amplitude pass filter 8, and the current Is is added to the assist torque current Ia outputted by the torque controller 2 by an adder 12, thereby the target current It is obtained. The current control means 3 controls the calculated target current It and the current Id detected by current detection means 6 to correspond to each other, and outputs the voltage instruction signal Sv such as PWM signal to the drive circuit 4, so that the motor 5 is driven and thus assist torque is generated.

Next, operation of the motor-driven power steering control apparatus configured as above is described according to a flowchart of FIG. 8. First, the steering torque signal τ0 being output of the torque sensor 1 is read by a microcomputer, and stored into a memory in step S201. Then, the assist torque current Ia is calculated by the torque controller 2 based on the steering torque signal τ0, and output of the torque controller is stored into the memory in step S202. Here, the torque controller 2 may be designed in a known manner, for example, in a manner that the current is calculated based on a predetermined map.

Next, the vibration component signal Sb is calculated by the small-amplitude pass filter 8 based on the steering torque signal T0, and stored into the memory in step S203. Next, the vibration suppression current Is is calculated by vibration suppression control means 9 based on the vibration component signal Sb, and stored into the memory in step S204. Then, the adder 12 adds the assist torque current Ia outputted by the torque controller 2 and the vibration suppression current Is outputted by the vibration suppression control means 9 so that the target current It is determined in step S205. Operation from the step S201 to the step S205 is repeated for each control sample to calculate each target current It.

Next, the vibration suppression control means 9 is described.

When the small-amplitude pass filter 8 and the vibration suppression control means 9 are used for the steering torque signal T0, the means 9 operates to assist a usual disturbance suppression effect using a gain of the torque controller 2. The steering torque signal TO includes not only a steering component but also a vibration component due to torque ripple, road surface disturbance or the like, and the torque controller assists steering, and furthermore, advantageously suppresses the vibration component by a control gain of the controller. Generally, it is known that when an open loop gain is made large enough compared with 1, influence of disturbance may be reduced. In such a case, a signal advanced in phase such as speed signal used in damping control need not be used, and when a control gain is increased by proportional gain control of a rotation angle or a steering torque signal, the open loop gain is further increased, and thus influence of disturbance may be further reduced. Any type of known control means may be used as the vibration suppression control means 9. For example, the configurations of FIGS. 6(a), 6(b) and 6(d) are described below as typical examples of the means 9.

The proportional gain controller of FIG. 6(a) operates as a controller that increases a proportional gain only for a vibration component based on a vibration component signal extracted from steering torque. In the PID gain controller of (b), since a phase characteristic or a gain characteristic may be adjusted by a plurality of parameters, appropriate vibration suppression characteristics may be obtained for various kinds of vibration compared with a simple proportional gain controller. For example, even if the open loop gain may not be made large enough compared with 1, a phase is advanced by a D gain, thereby a damping-like effect may be obtained, and consequently vibration may be suppressed. In the case of the saturation controller using a saturation function of (d), the controller operates in the same way as the proportional gain controller of (a) in a slope region, but a value is fixed in a saturation region, which may prevent control instructions from being increased more than necessary. The control means shown in FIGS. 6(*a*), 6 (*b*) and 6(*d*) are typically used elements, and each of the control means is combined with the small-amplitude pass filter 8 to establish a feedback control loop, so that vibration suppression may be easily achieved.

As hereinbefore, according to the configuration of the embodiment 2 of the invention, the steering component is removed from the steering torque signal T0, and a vibration component such as torque ripple produced by a motor or disturbance from a road surface, which has a small amplitude compared with the signal T0, may be accurately extracted, and vibration may be reduced based on the extracted vibration component signal, and therefore feeling of a driver may be improved.

While the embodiment 1 or 2 shows a case where the small-amplitude pass filter and the vibration suppression control means are used for a rotational speed signal calculated from a detection signal of rotational speed or a rotation angle, or used for a steering torque signal, the filter and the means may be further used for a rotation angle signal, an estimated rotational speed signal estimated by an observer or the like, an estimated steering torque signal, an steering angle or steering speed of a steering wheel, horizontal acceleration of a car, or dynamic state quantity of a yaw rate or the like.

Figure 1:
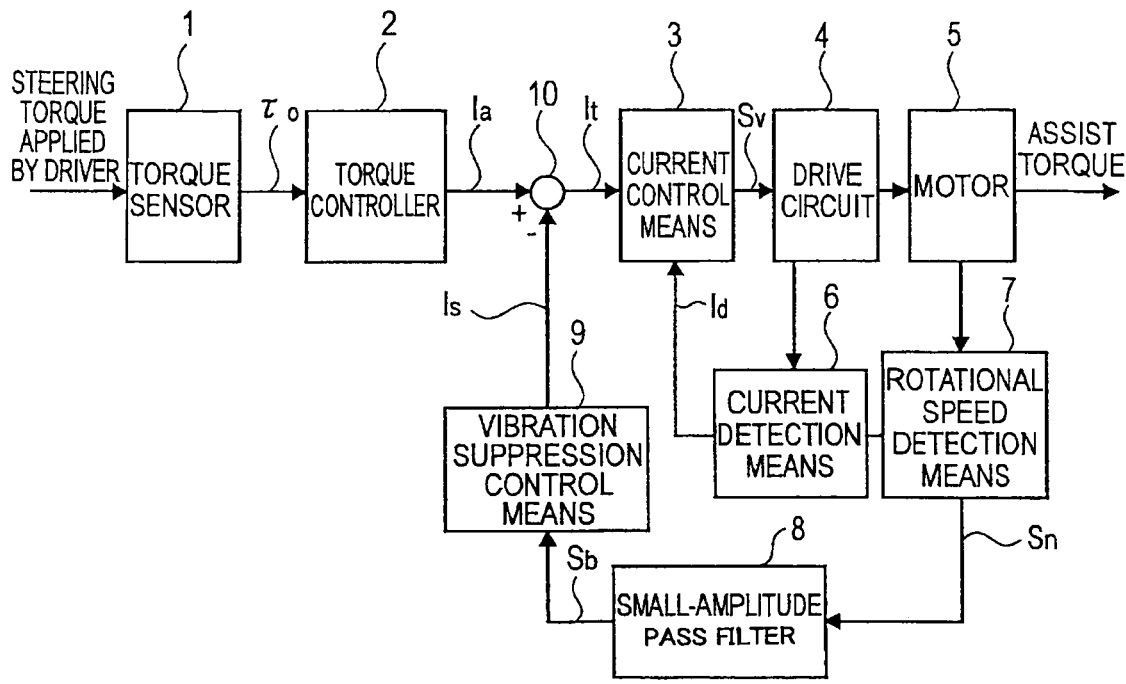
FIG. 1 It is a block diagram showing an motor-driven power steering control apparatus according to embodiment 1 of the invention.
Figure 2:
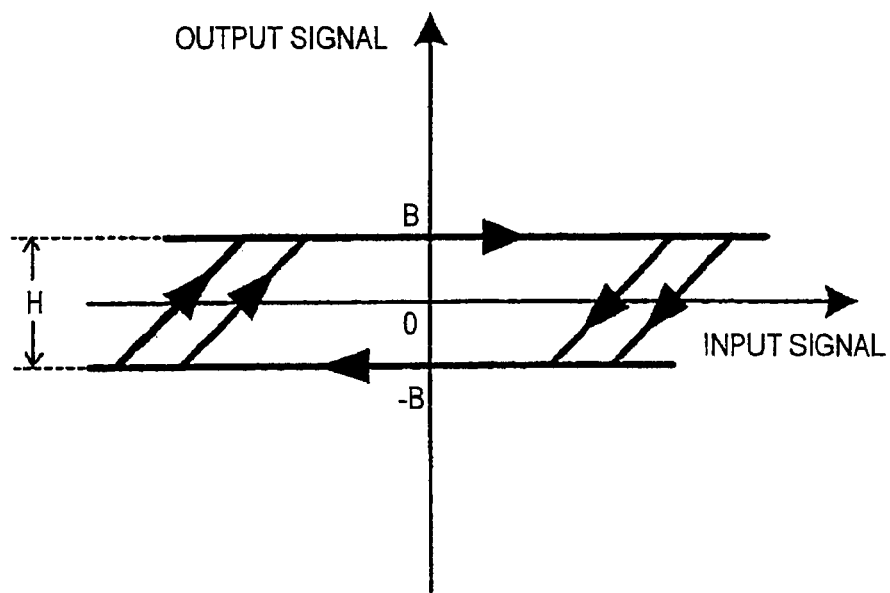
FIG. 2 It is an input/output characteristic diagram showing a small-amplitude pass filter in each of embodiments 1 and 2 of the invention.
Figure 3:
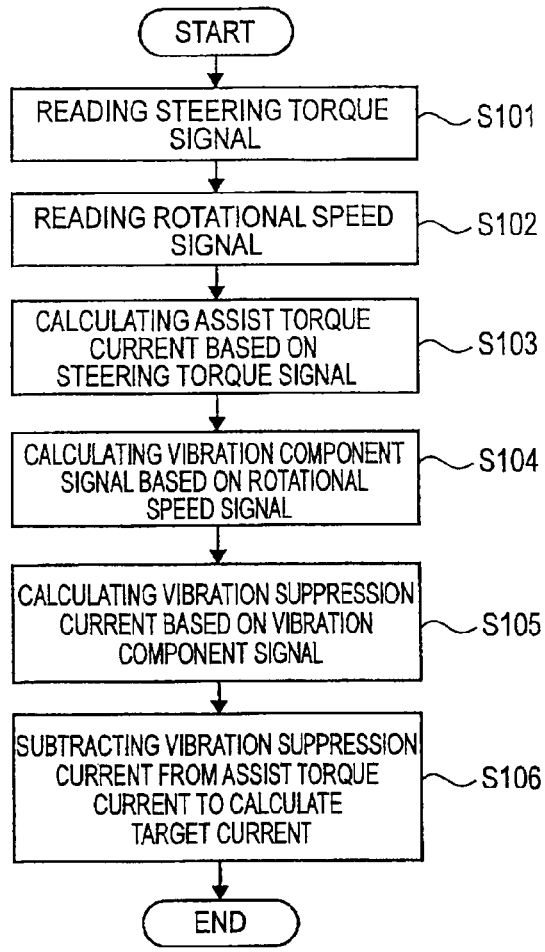
FIG. 3 It is a flowchart showing processing within a microcomputer in the embodiment 1 of the invention.
Figure 4:
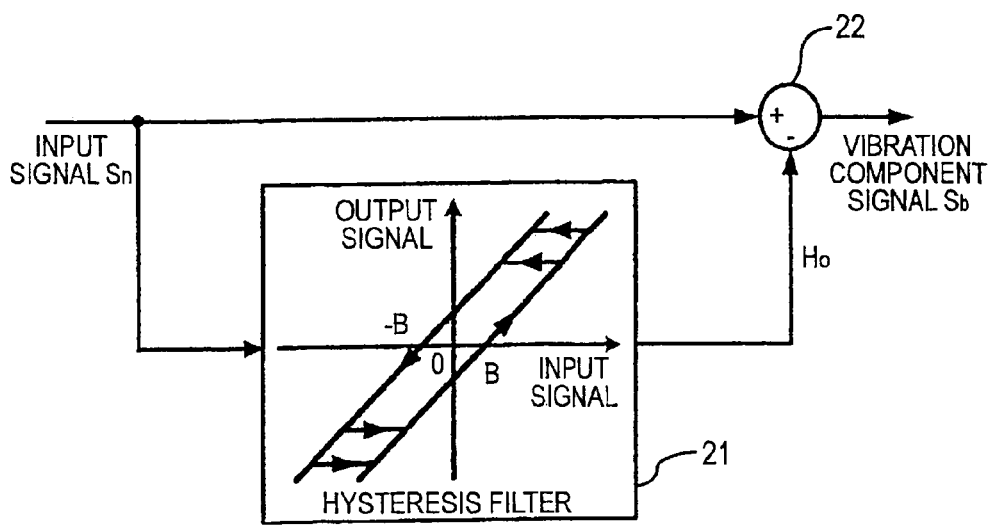
FIG. 4 It is a block diagram showing a configuration example of the small-amplitude pass filter in each of the embodiments 1 and 2 of the invention.
Figure 5A:
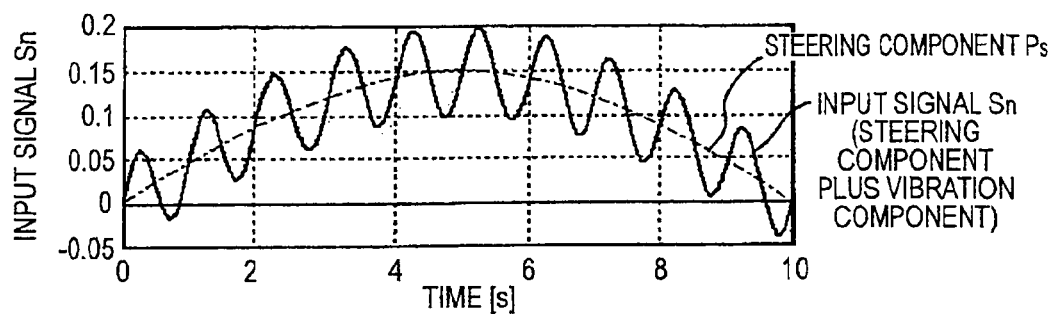
FIG. 5 It is temporal waveforms of input/output signals showing an operation example of the small-amplitude pass filter in each of the embodiments 1 and 2 of the invention.
Figure 5B:
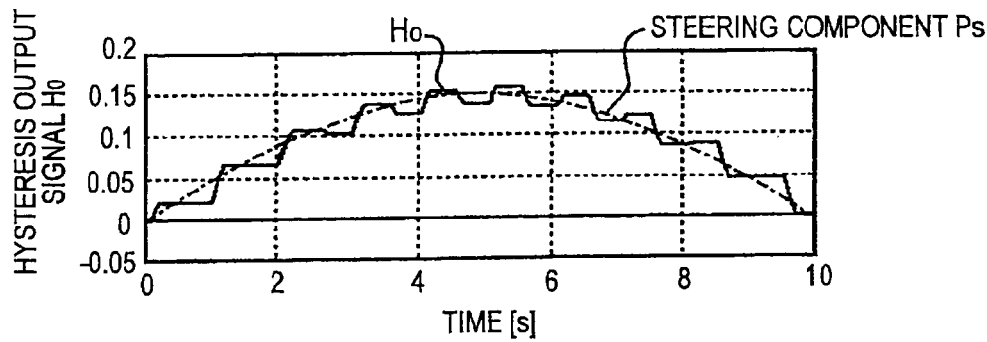
Figure 5C:
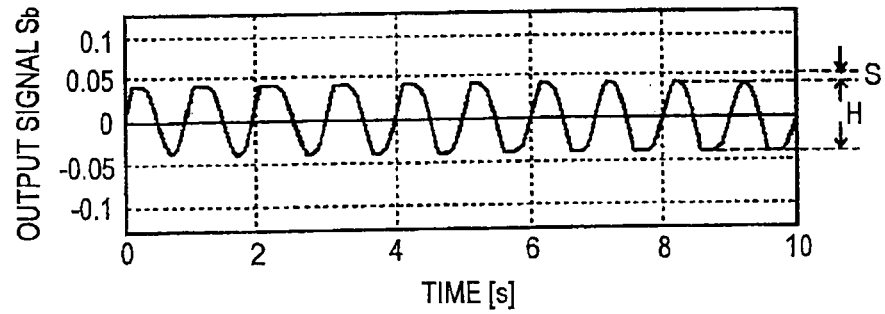
Figure 6:
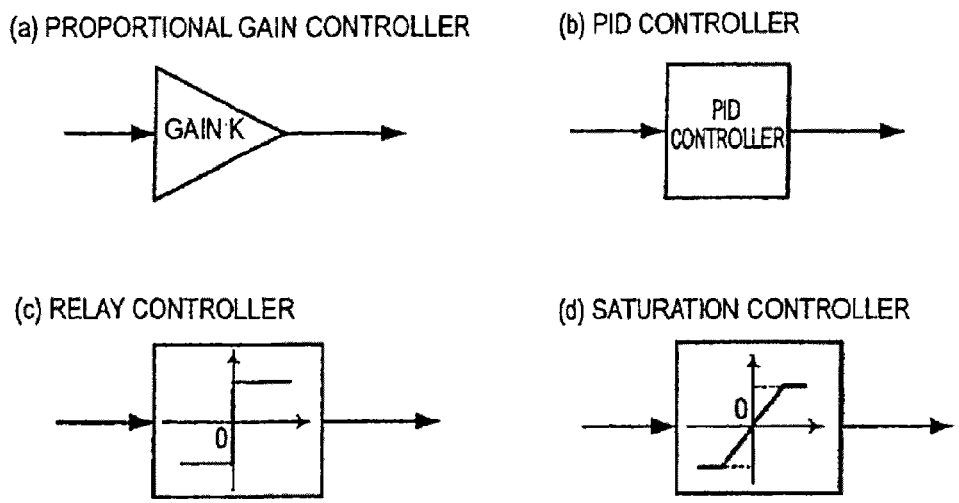
FIG. 6 It is block diagrams showing a vibration suppression controller in each of the embodiments 1 and 2 of the invention.
Figure 7:
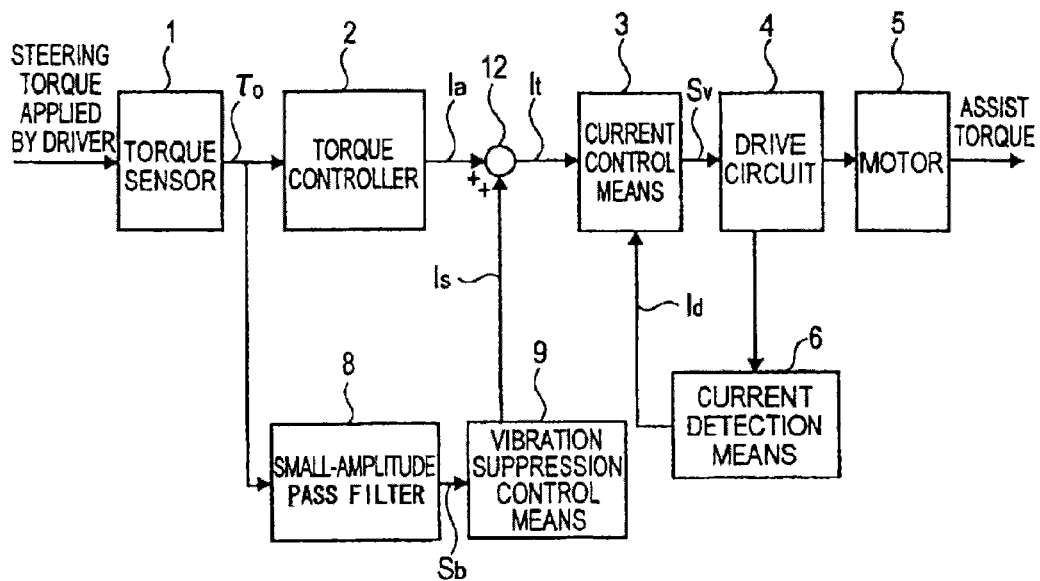
FIG. 7 It is a block diagram showing a motor-driven power steering control apparatus according to the embodiment 2 of the invention.
Figure 8:
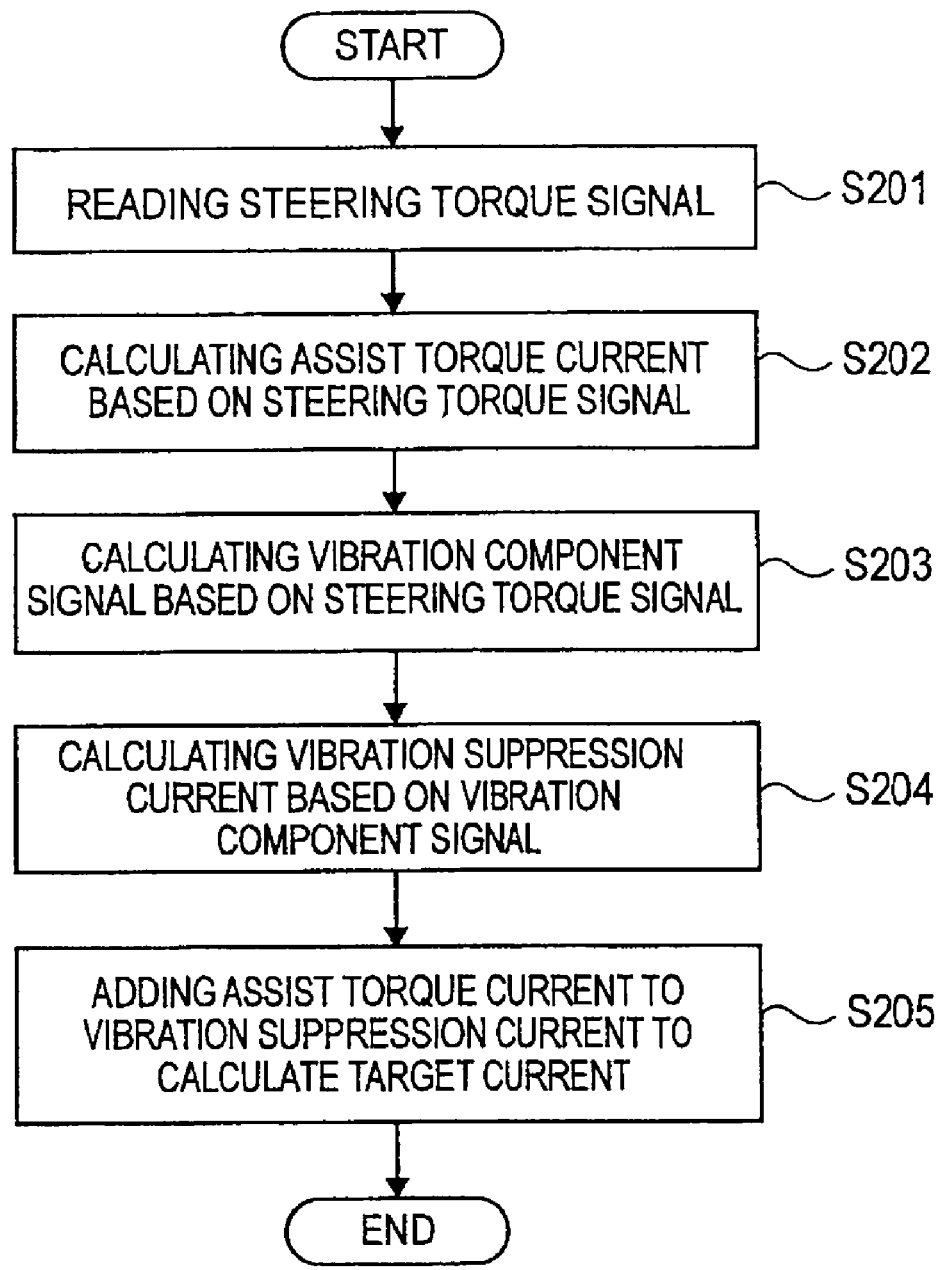
FIG. 8 It is a flowchart showing processing within a microcomputer in the embodiment 2 of the invention.

DESCRIPTION OF THE REFERENCE NUMERALS AND SIGNS 1 torque sensor
2 torque controller
5 motor
6 current detection means
7 rotational speed detection means
8 small-amplitude pass filter
9 vibration suppression control means
21 hysteresis filter

The invention claimed is:

1. A motor-driven power steering control apparatus for use with a car, including a torque sensor detecting steering torque applied by a driver, a torque controller calculating an assist torque current assisting the steering torque based on a steering torque signal detected by the torque sensor, and a motor generating assist torque with the assist torque current, comprising:

dynamic state quantity detection means detecting dynamic state quantity of the motor-driven power steering control apparatus;

a small-amplitude pass filter filtering out a vibration component having a small amplitude compared with a steering component from a detection output of the dynamic state quantity detection means and preventing amplitudes of the detection output which are larger than the small amplitude from passing, the small-amplitude pass filter including a hysteresis filter which performs hysteresis function processing having a hysteresis range corresponding to the vibration component, and a subtractor subtracting an output signal of the hysteresis filter from the output signal of the dynamic state quantity detection means; and vibration suppression control means reducing a vibration component signal obtained by the small-amplitude pass filter;

wherein a feedback control loop, including a combiner between the assist torque current being output from the torque controller and a vibration suppression current being output from the vibration suppression control means, is established, to suppress a vibration component of the motor.

2. The motor-driven power steering control apparatus according to claim 1, wherein, the dynamic state quantity detection means includes rotational speed detection means detecting rotational speed of the motor.

3. The motor-driven power steering control apparatus according to claim 1, wherein, the dynamic state quantity detection means includes a torque sensor detecting the steering torque signal.

4. The motor-driven power steering control apparatus according to claim 1, wherein, the dynamic state quantity detection means includes rotation angle detection means detecting a rotation angle of the motor, and rotational speed calculation means calculating rotational speed from a detected rotation angle signal.

5. The motor-driven power steering control apparatus according to claim 1, wherein:

the combiner includes a subtractor.

6. The motor-driven power steering control apparatus according to claim 1, wherein:

the combiner includes an adder.

* * * * *